US012774053B2

(12) United States Patent
Miyagawa

(10) Patent No.: US 12,774,053 B2
(45) Date of Patent: Oct. 27, 2026

(54) WINDSCREEN DEVICE

(71) Applicant: HONDA MOTOR CO., LTD., Minato-ku (JP)

(72) Inventor: Shinobu Miyagawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 143 days.

(21) Appl. No.: 18/895,815

(22) Filed: Sep. 25, 2024

(65) Prior Publication Data

US 2025/0128778 A1 Apr. 24, 2025

(30) Foreign Application Priority Data

Oct. 18, 2023 (JP) ................................ 2023-179674

(51) Int. Cl.
*B62J 17/04* (2006.01)
*B60J 1/04* (2006.01)

(52) U.S. Cl.
CPC . *B62J 17/04* (2013.01); *B60J 1/04* (2013.01)

(58) Field of Classification Search
CPC .................................... B62J 17/04; B60J 1/04
USPC ................................................ 296/77.1, 78.1
See application file for complete search history.

(56) References Cited

U.S. PATENT DOCUMENTS

2016/0251048 A1* 9/2016 Suzuki ..................... B62J 17/04 296/78.1
2016/0251049 A1* 9/2016 Tsuda ....................... B62J 17/04 296/78.1
2017/0267304 A1* 9/2017 Nakano .................... B62J 17/04
2018/0244134 A1* 8/2018 Beeman ...................... B60J 1/04
2021/0107584 A1* 4/2021 Sawada .................... B62J 17/04
2022/0144366 A1* 5/2022 Naoi ........................ B62J 17/04
2023/0339560 A1* 10/2023 Tsai ......................... B62J 17/04
2025/0128778 A1* 4/2025 Miyagawa ............... B62J 17/04
(Continued)

FOREIGN PATENT DOCUMENTS

CN 210310684 4/2020
CN 114030547 2/2022
JP 2017-124808 7/2017
(Continued)

OTHER PUBLICATIONS

Japanese Office Action fro Japanese Patent Application No. 2023-179674 mailed Jun. 17, 2025.

*Primary Examiner* — Gregory A Blankenship
(74) *Attorney, Agent, or Firm* — Amin, Turocy & Watson, LLP

(57) ABSTRACT

A shaft that connects an upper link member supporting a windscreen in a vertically swingable manner and a bracket is included, one side of the shaft in a vehicle left-right direction has a bracket side gear supported by the bracket in a relatively non-rotatable manner, and a link side gear supported by the upper link member in a relatively non-rotatable manner, rotation regulation portions (uneven shapes) capable of regulating relative rotation are provided at axially facing portions of the bracket side gear and the link side gear, respectively, and the rotation regulation portions are pressed by a gear lock mechanism to regulate relative rotation between the bracket side gear and the link side gear, and can release regulation on the relative rotation between the bracket side gear and the link side gear when pressing by the gear lock mechanism is released.

3 Claims, 8 Drawing Sheets

(56) References Cited

U.S. PATENT DOCUMENTS

| | | | | |
|---|---|---|---|---|
| 2025/0296649 | A1* | 9/2025 | Naoi | B62J 17/04 |
| 2025/0296650 | A1* | 9/2025 | Nishida | B62J 17/04 |

FOREIGN PATENT DOCUMENTS

| | | |
|---|---|---|
| JP | 6367263 | 8/2018 |
| JP | 7194262 | 12/2022 |

* cited by examiner

WINDSCREEN DEVICE

CROSS-REFERENCE TO RELATED APPLICATION

Priority is claimed on Japanese Patent Application No. 2023-179674, filed Oct. 18, 2023, the content of which is incorporated herein by reference.

BACKGROUND OF THE INVENTION

Field of the Invention

The present invention relates to a windscreen device.

Description of Related Art

Conventionally, there has been known a windscreen device including a windscreen rising forward from a riding position and a screen support mechanism that allows the windscreen to be manually raised and lowered (for example, see Patent documents 1 and 2).

[Patent document 1] Japanese Unexamined Patent Application, First Publication No. 7194262

[Patent document 2] Japanese Unexamined Patent Application, First Publication No. 6367263

SUMMARY OF THE INVENTION

In the above-described conventional constitution, operation portions for unlocking height adjustment of the windscreen are provided on both left and right sides of the screen support mechanism. When unlocking height adjustment of the windscreen, it is necessary for a user to simultaneously perform operations of pulling the operation portions on the left and right sides outward in a left-right direction. For this reason, when the height of the windscreen is adjusted, the user needs to perform the operations using both hands, but there is a demand for a constitution that can more easily adjust the height of the windscreen.

An aspect of the present invention has been made in view of the above circumstances, and an object of the present invention is to provide a windscreen device capable of more easily adjusting the height of the windscreen.

In order to solve the above problem and achieve the object, the present invention adopts the following aspects.

<1> An aspect according to the present invention includes a windscreen, a holder that supports the windscreen, a bracket fixed to a vehicle body, link members having proximal ends supported by the bracket in a vertically swingable manner and supporting the holder at distal ends, and a shaft extending along a vehicle left-right direction and passing through and connecting the proximal end of the link member and a link connection portion of the bracket in the vehicle left-right direction, wherein one side of the shaft in the vehicle left-right direction has a bracket side engagement member disposed coaxially with the shaft and supported by the link connection portion of the bracket in a relatively non-rotatable manner, a link side engagement member that is disposed coaxially with the shaft outside the bracket side engagement member in the vehicle left-right direction, is supported by the proximal end of the link member in a relatively non-rotatable manner, faces the bracket side engagement member in an axial direction, and is movable forward and backward in the axial direction, and a lock mechanism that is disposed outside the link side engagement member in the vehicle left-right direction and presses the link side engagement member inward in the vehicle left-right direction to fix the link side engagement member and the bracket side engagement member in a relatively non-rotatable state, rotation regulation portions capable of regulating relative rotation of the bracket side engagement member and the link side engagement member are provided at axially facing portions of the bracket side engagement member and the link side engagement member, respectively, and the lock mechanism includes an operator that switches between a lock position and an unlock position, and a pressing member that presses the link side engagement member inward in the vehicle left-right direction when the operator is at the lock position, and releases pressing of the link side engagement member inward in the vehicle left-right direction when the operator is at the unlock position, when the operator is at the lock position, the respective rotation regulation portions of the bracket side engagement member and the link side engagement member are fixed in a state of regulating relative rotation of the bracket side engagement member and the link side engagement member by a pressing force of the pressing member, and when the operator is at the unlock position, the respective rotation regulation portions of the bracket side engagement member and the link side engagement member are allowed to release regulation on relative rotation of the bracket side engagement member and the link side engagement member since the link side engagement member is allowed to move outward in the vehicle left-right direction.

According to this aspect, the holder supporting the windscreen and the bracket fixed to the vehicle body are connected via the link members, and the bracket side engagement member and the link side engagement member, which are relatively non-rotatable with respect to each other by pressing in the axial direction, are disposed at the proximal end of the link member on the bracket side. The lock mechanism disposed on one side in the vehicle left-right direction switches between pressing of the link side engagement member by the pressing member and release of the pressing through an operation of the operator. In a state where pressing by the pressing member is released, the link side engagement member is movable to the outside in the vehicle left-right direction, and relative rotation of the bracket side engagement member and the link side engagement member is allowed. By collectively disposing the lock mechanism and the operator on one side in the vehicle left-right direction, the user can perform one-hand operation, and the height of the windscreen can be easily adjusted. It is possible to reduce the size of the mechanical component and the number of components, and it is possible to reduce the weight and size of the entire device.

<2> In the aspect <1>, uneven shapes meshing with each other may be provided as the rotation regulation portions on the axially facing portions of the bracket side engagement member and the link side engagement member, respectively.

According to this aspect, since the uneven shapes as the rotation regulation portions are provided at the respective facing portions of the bracket side engagement member and the link side engagement member, relative rotation of the bracket side engagement member and the link side engagement member can be reliably regulated by pressing by the pressing member.

<3> In the aspect <2>, an elastic member compressed between the pressing member and the link side engagement member may be included, wherein, when the operator is at the unlock position, the respective uneven shapes of the bracket side engagement member and the link side engagement member may be meshed with each other by a biasing force of the elastic member, the pressing member may be separated from the link side engagement member by the biasing force of the elastic member, in this state, the link side engagement member may be displaceable outward in the vehicle left-right direction against the biasing force of the elastic member by torque greater than or equal to a specified value, and the bracket side engagement member and the link side engagement member may be relatively rotatable.

According to this aspect, by biasing the link side engagement member inward in the vehicle left-right direction using the elastic member, relative rotation of the bracket side engagement member and the link side engagement member is appropriately regulated even when pressing by the pressing member is released. On the other hand, when the torque greater than or equal to a specified value acts on the link side engagement member, the uneven shape of the link side engagement member rides on the uneven shape of the bracket side engagement member, the link side engagement member is displaced outward in the vehicle left-right direction against the biasing force of the elastic member, and the link side engagement member can be rotated while shifting meshing of the uneven shapes step by step. As a result, after pressing of the link side engagement member by the pressing member of the lock mechanism is released, the link member can be swung with a predetermined click feeling with respect to the bracket, and the height of the windscreen can be easily adjusted. By elastically temporarily holding the screen height by the biasing force of the elastic member, an operation procedure can be simplified as compared with, for example, a constitution in which the screen height is adjusted while the operator is pulled.

According to an aspect of the present invention, it is possible to provide a windscreen device capable of more easily adjusting the height of the windscreen.

DETAILED DESCRIPTION OF THE INVENTION

Figure 1:
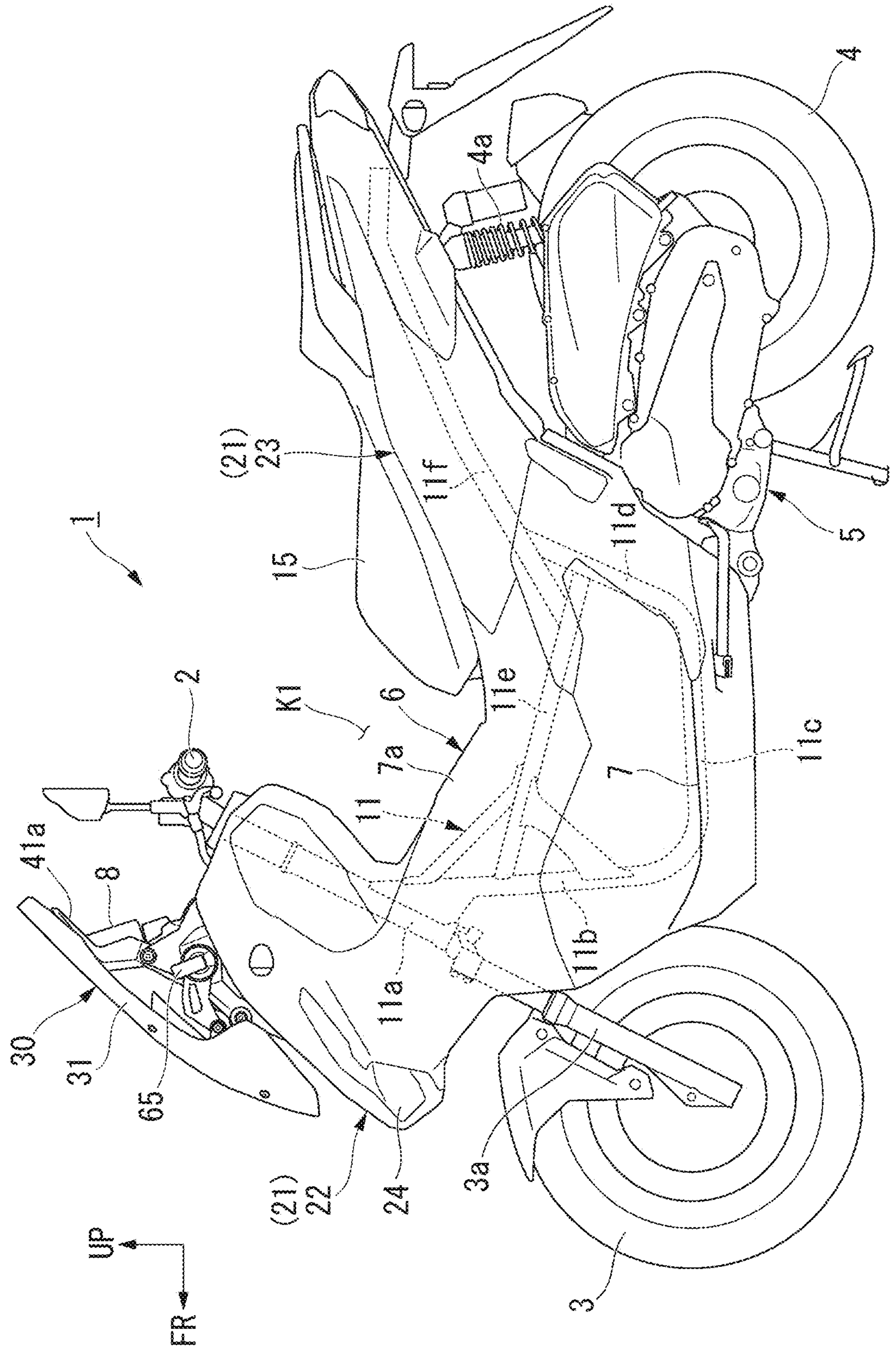
FIG. 1 is a left side view of a motorcycle according to an embodiment of the present invention.

An embodiment of the present invention will hereinafter be described with reference to the drawings. Orientations such as front, rear, left, and right indicated in the following description are the same as the orientations with respect to a vehicle to be described below, unless otherwise described. In addition, an arrow FR indicating a front side of the vehicle, an arrow LH indicating a left side of the vehicle, an arrow UP indicating an upper side of the vehicle, and a line CL indicating the center in a left-right direction of a vehicle body are illustrated at appropriate positions in the drawing used in the following description.

<Entire Vehicle>

FIG. 1 illustrates a scooter-type motorcycle (saddle-ride vehicle) 1 as an example of a saddle-ride vehicle according to an embodiment.

The motorcycle 1 includes a front wheel 3, which is a steering wheel, and a rear wheel 4, which is a driving wheel. The front wheel 3 is supported by a front fork 3*a* and steerable by a bar handle 2. The rear wheel 4 is supported by, for example, a swing-type power unit 5, and can be driven by the power unit 5. The swing-type power unit 5 integrally includes a prime mover such as an internal combustion engine and an electric motor, and a transmission device that transmits an output of the prime mover to the rear wheel 4.

Steering system components including the bar handle 2, the front fork 3*a*, and the front wheel 3 are steerably supported by a head pipe 11*a* at a front end of a vehicle body frame 11. A front portion of the swing-type power unit 5 is supported by a front-rear intermediate portion of the vehicle body frame 11 in a vertically swingable manner. The rear portion of the power unit 5 is supported by the rear portion of the vehicle body frame 11 via a rear cushion 4*a*. "Intermediate" in the embodiment is not limited to the "center".

In the embodiment, the telescopic front fork 3*a* is illustrated as a front wheel suspension device of the motorcycle 1, but the present invention is not limited to this constitution. For example, the front wheel suspension device may be of another type such as a link type using a swing arm.

The motorcycle 1 is not limited to the unit swing-type vehicle as described above, and may be a vehicle in which a prime mover is fixedly mounted on the vehicle body frame 11.

A seat 15 on which a passenger is to be seated is arranged behind the bar handle 2. A low floor portion 6 of the vehicle body is provided between the bar handle 2 and the seat 15. A straddling space K1 is formed above the low floor portion 6 in which the passenger can easily straddle the vehicle body. The low floor portion 6 includes a pair of left and right floor steps 7 on which the driver seated on the seat 15 places left and right feet, and a center tunnel 7*a* extending in the vehicle front-rear direction between the left and right floor steps 7.

<Vehicle Body Frame 11>

Referring to FIG. 1, the vehicle body frame 11 includes a head pipe 11*a*, a down frame 11*b* extending downward and rearward from the head pipe 11*a*, a lower frame 11*c* extending rearward from a lower end of the down frame 11*b*, a center frame 11*d* extending rearward and upward from a rear end of the lower frame 11*c*, a middle frame 11*e* bridged between the down frame 11*b* and the center frame 11*d*, and a rear frame 11*f* having a front end connected to a rear upper side of the middle frame 11*e* and extending rearward and upward from the front end.

The upper end of the center frame 11*d* is connected to the lower side of the front portion of the rear frame 11*f*. The down frame 11*b*, the lower frame 11*c*, and the center frame 11*d* are formed of an integrated frame member continuous with a bent portion interposed therebetween. The down frame 11*b*, the lower frame 11*c*, the center frame 11*d*, the middle frame 11*e*, and the rear frame 11*f* are provided on the left and right sides of the vehicle body to form a pair of left and right.

<Vehicle Body Cover 21>

The periphery of the vehicle body frame 11 is covered with a vehicle body cover 21. The vehicle body cover 21 includes the left and right floor steps 7 and the center tunnel 7*a*, a front body cover 22 connected to the front of the left and right floor steps 7 and the center tunnel 7*a*, and a rear body cover 23 connected to the rear of the left and right floor steps 7 and the center tunnel 7*a*.

An article storage box (not illustrated) is arranged inside the rear body cover 23. The article storage box is shaped as a container that opens upward. An upper opening of the article storage box can be opened and closed by rotation of the seat 15 via a hinge (not illustrated) on a front end side.

Figure 2:
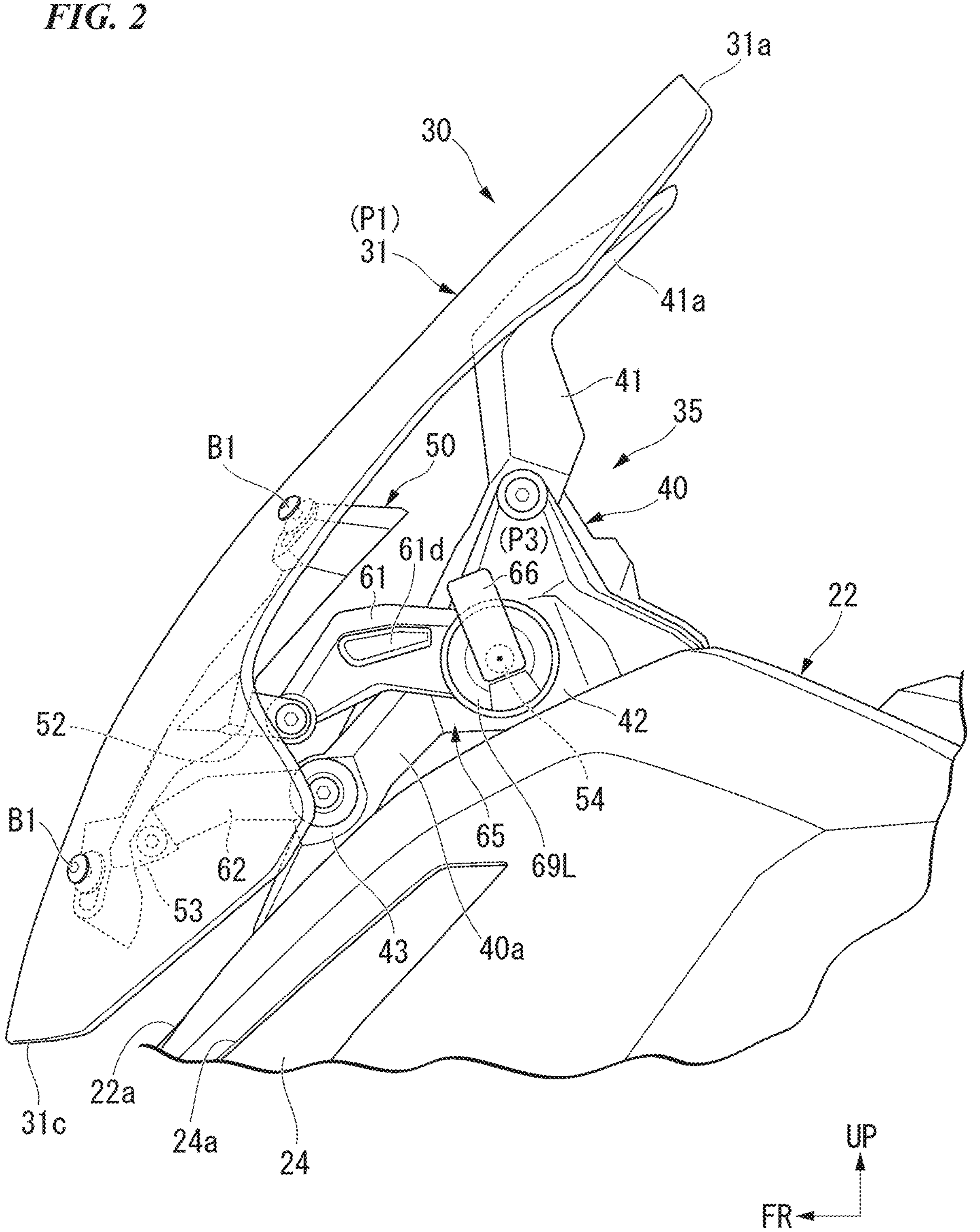
FIG. 2 is a left side view around a windscreen of the motorcycle.

FIG. 2 is a left side view around a windscreen 31.

Referring to FIGS. 1 and 2, the windscreen 31 rising in front of a riding position of the motorcycle 1 is disposed above and in front of the front body cover 22. The windscreen 31 is supported by a vehicle body including the front body cover 22 and a cover support frame (not illustrated) via a screen support mechanism 35. The windscreen 31 (screen main body) and the screen support mechanism 35 are included in a windscreen device 30 of the motorcycle 1.

<Windscreen Device 30>

Referring to FIGS. 1 and 2, the windscreen 31 extends to rise upward and rearward from a lower end side in front of the riding position where a driver drives the motorcycle 1. The windscreen 31 extends obliquely in a side view from the lower end side toward an upper rear side. The windscreen 31 can be moved up and down by manually operating the screen support mechanism 35 (movable mechanism).

A lower portion of windscreen 31 is fixed to a holder 50 of the screen support mechanism 35. The holder 50 is supported by a bracket 40 fixed to the vehicle body in the screen support mechanism 35 so as to be vertically movable. The screen support mechanism 35 includes an operation portion 65 for enabling manual operation by the driver (occupant or user) on the left side of the vehicle. The screen support mechanism 35 is capable of vertically moving the windscreen 31 by a manual operation of the user on operation portion 65.

Here, a meter device 8 is disposed in front of the handle 2 on an upper portion of the front body cover 22. The meter device 8 functions as, for example, a meter indicating a vehicle speed and an engine speed. The meter device 8 is supported by, for example, the front body cover 22 and the cover support frame (not illustrated) separately from the steering system components. The meter device 8 includes, for example, a display device such as a liquid crystal display that displays images of various information of the motorcycle 1. The meter device 8 is disposed, for example, with a rectangular display screen facing the rear side (driver side).

The meter device 8 is supported by a meter support 41 provided at a rear portion of the bracket 40 of the screen support mechanism 35. A meter visor 41*a* is provided in an upper portion of the meter support 41. The meter visor 41*a* extends rearward from a range extending across upper portions of an upper edge and left and right side edges of the meter device 8, and covers an upper portion of the display screen. The meter visor 41*a* functions as a canopy, and prevents light from the outside from being reflected by the display screen to make the display screen difficult to see.

<Windscreen 31>

Referring to FIGS. 1 and 2, the windscreen 31 is formed in a plate shape using, for example, a transparent resin material. The windscreen 31 has a gently bulging shape protruding forward and upward according to the appearance of the vehicle. The windscreen 31 controls a flow of the traveling wind toward the driver when the motorcycle 1 travels forward. The windscreen 31 is formed symmetrically with respect to left-right center line CL of the vehicle body.

Figure 3:
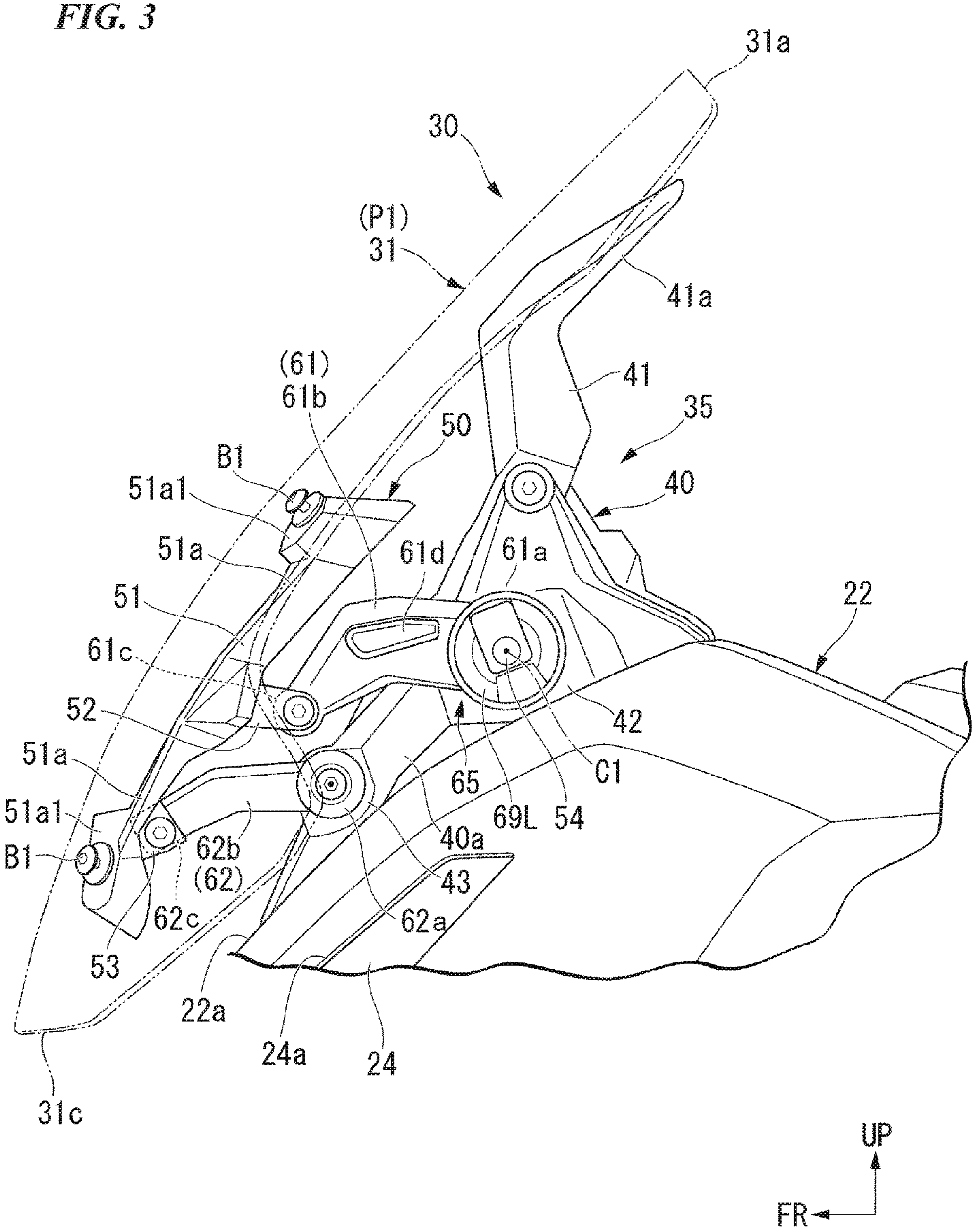
FIG. 3 is a left side view when the windscreen is at a lower limit position.
Figure 4:
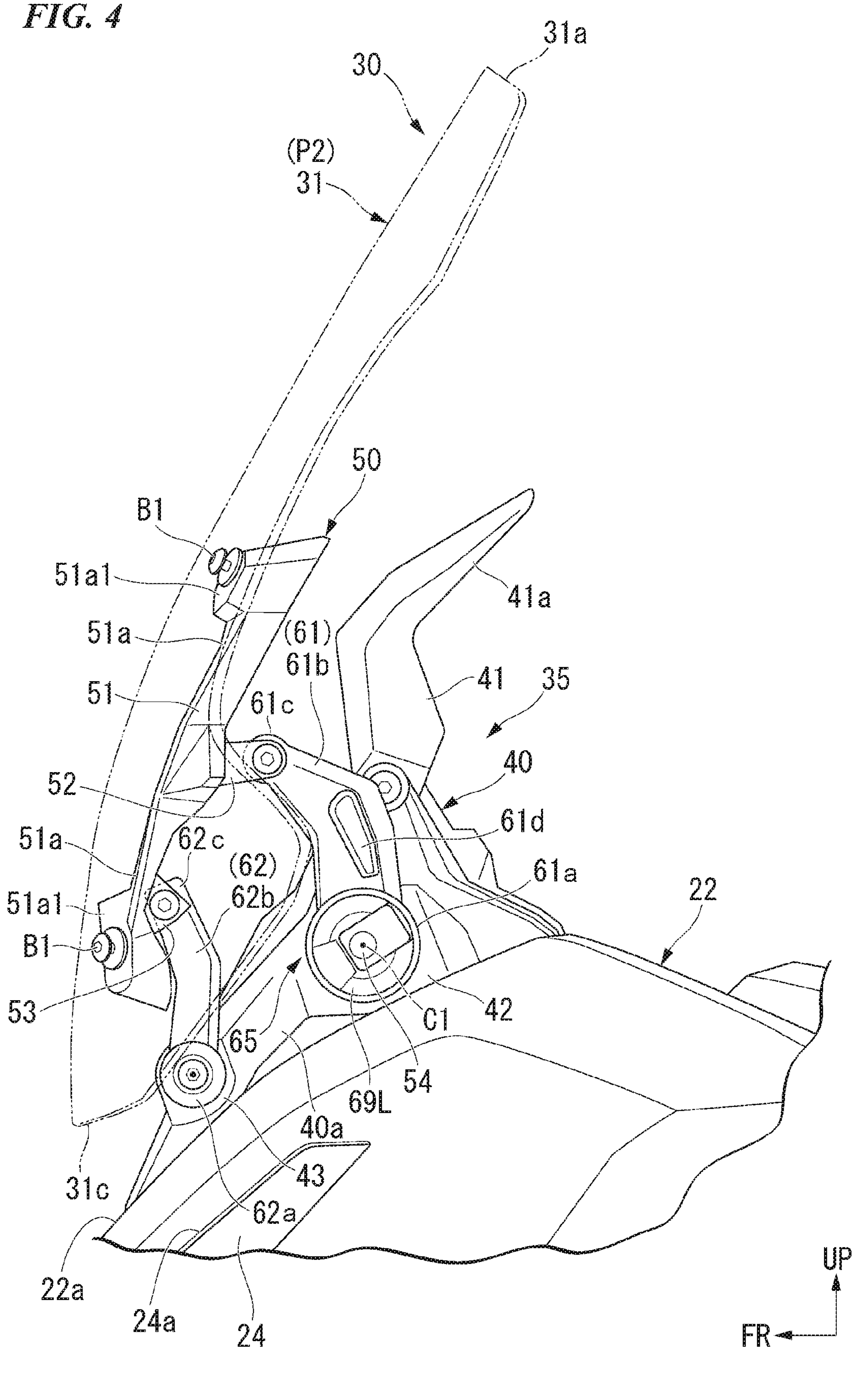
FIG. 4 is a left side view when the windscreen is at an upper limit position.
Figure 5:
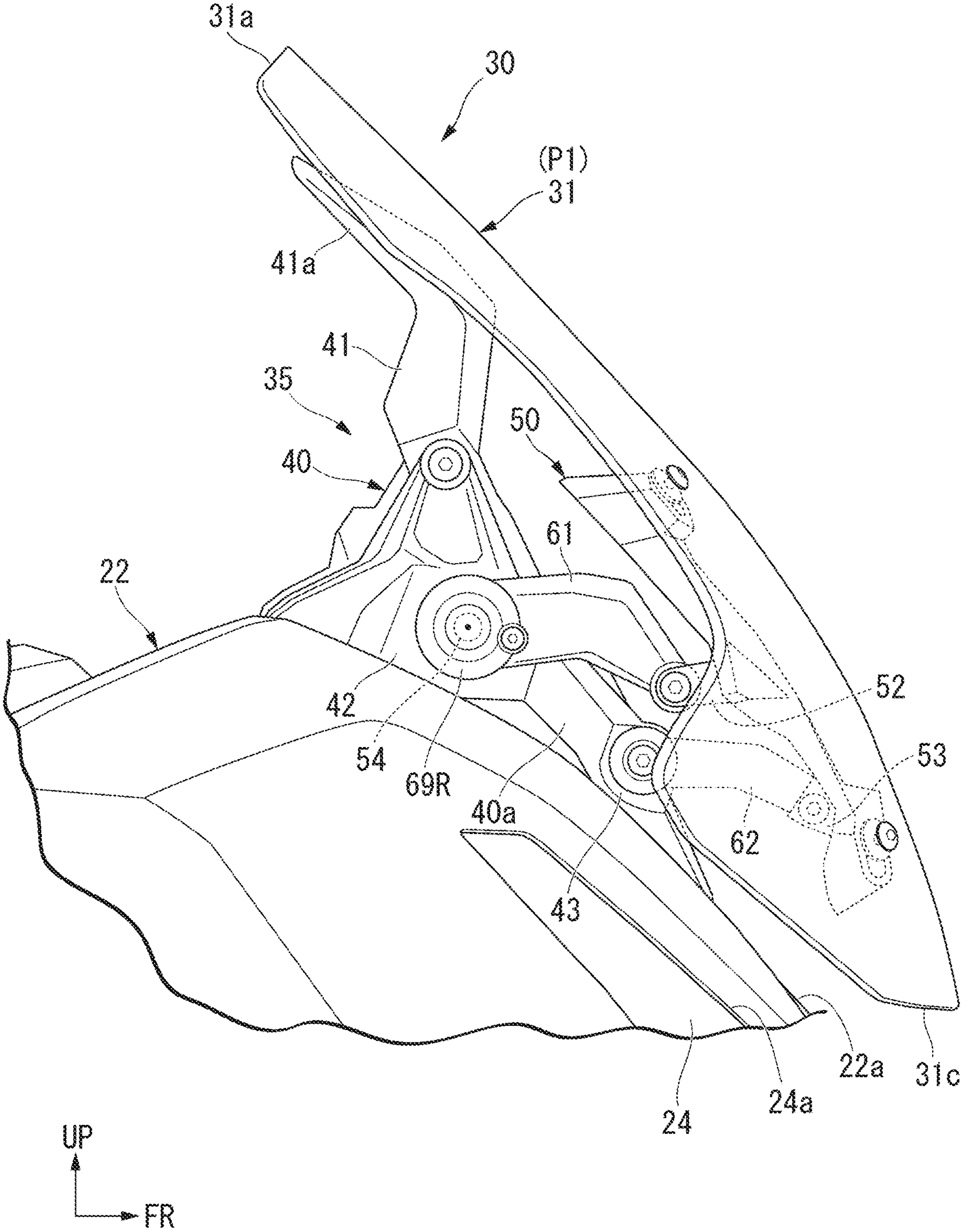
FIG. 5 is a right side view when the windscreen is at the lower limit position.

FIG. 3 is a left side view when the windscreen 31 is at a lower limit position P1, FIG. 4 is a left side view when the windscreen 31 is at an upper limit position P2, and FIG. 5 is a right side view when the windscreen 31 is at the lower limit position P1.

The windscreen 31 is supported by the screen support mechanism 35 so as to be height-adjustable with respect to the vehicle body. The windscreen 31 is bidirectionally movable between the lower limit position P1 illustrated in FIG. 3 and the upper limit position P2 illustrated in FIG. 4 by the operation of the screen support mechanism 35. Support arms 51*a* of the holder 50 are fastened and fixed to both left and right sides of a vertically intermediate portion of the windscreen 31.

The windscreen 31 at the lower limit position P1 is disposed so as to be inclined along a front upper surface 22*a* of the front body cover 22 inclined rearward and upward in a side view. A front lower end (lower edge portion 31*c*) of the windscreen 31 at the lower limit position P1 is separated upward and backward from an upper edge 24*a* of a headlight 24 (see FIG. 2). This prevents the windscreen 31 from affecting light distribution of the headlight 24. The front lower end of the windscreen 31 at the lower limit position P1 is separated to the vehicle outer side (front upper side) from the front upper surface 22*a* of the front body cover 22. As a result, part of the traveling air can be introduced between the windscreen 31 and the front body cover 22. A rear upper end of the windscreen 31 at the lower limit position P1 is positioned above the meter visor 41*a*.

The windscreen 31 at the upper limit position P2 is disposed so as to move rearward and upward such that the front lower end is along the front upper surface 22*a* of the front body cover 22 as compared with when being at the lower limit position P1, and to stand upright rearward and upward as compared with when being at the lower limit position P1.

Referring to the front lower end of the windscreen 31 at the upper limit position P2, the front lower end is moved rearward and upward as compared with when being at the lower limit position. The front lower end of the windscreen 31 at the upper limit position P2 is separated to the vehicle outer side (front upper side) from the front body cover 22 and the bracket 40. As a result, as in the case where the windscreen 31 is at the lower limit position P1, part of the traveling air can be introduced between the windscreen 31 and the front body cover 22. The rear upper end of the windscreen 31 at the upper limit position P2 moves upward as compared with when being at the lower limit position P1 to further reduce the traveling air volume toward the driver.

<Screen Support Mechanism 35>

Figure 6:
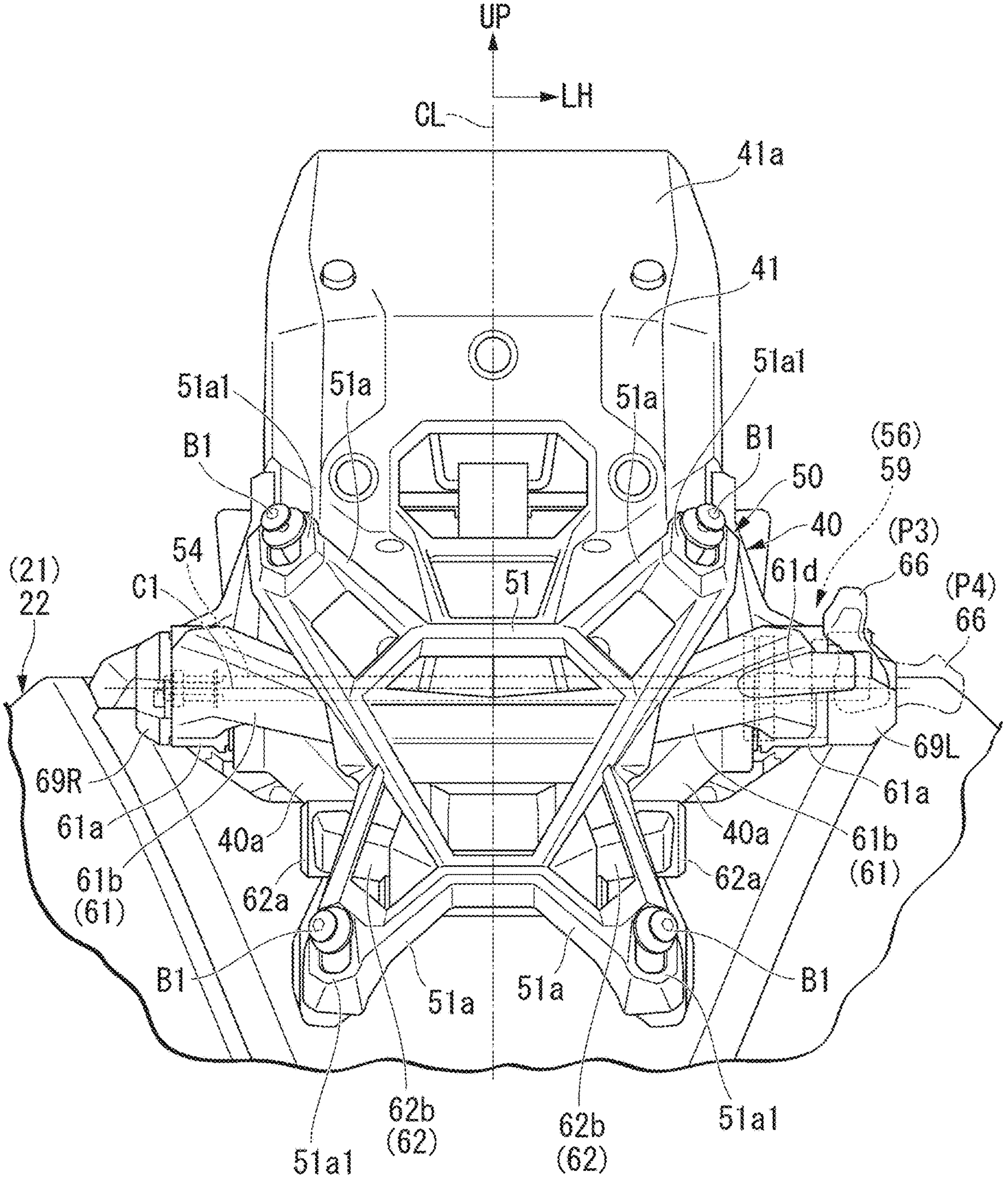
FIG. 6 is a front view of a screen support mechanism.

FIG. 6 is a front view of the screen support mechanism 35.

Referring to FIGS. 3, 4, and 6, the screen support mechanism 35 includes the bracket 40 fixed to the vehicle body, upper and lower link members 61 and 62 having proximal ends 61*a* and 62*a* supported by the bracket 40 in a vertically swingable manner, the holder 50 supported by distal ends 61*c* and 62*c* of the upper and lower link members 61 and 62, and the windscreen 31 attached to the holder 50. Each of the bracket 40, the upper and lower link members 61 and 62, and the holder 50 is formed of, for example, synthetic resin.

The bracket 40 includes a bracket main body 40*a* disposed along the front upper surface 22*a* of the front body cover 22 in a side view so as to be inclined rearward and upward, an upper link connection portion 42 that extends from an upper portion of the bracket main body 40*a* toward the windscreen 31 side and relatively rotatably connects the proximal end 61*a* of the upper link member 61 via a rotation shaft along the left-right direction, and a lower link connection portion 43 that extends from a lower portion of the bracket main body 40*a* toward the windscreen 31 side and relatively rotatably connects the proximal end 62*a* of the lower link member 62 via the rotation shaft along the left-right direction.

The meter visor 41*a* and the meter support 41 supporting the meter device 8 are supported above the rear portion of the bracket 40.

The upper link member 61 includes a pair of left and right proximal ends 61*a* disposed on outer side of the rear portion of the bracket 40 in the left-right direction, a pair of left and right arms 61*b* extending forward and inward in the left-right direction from the left and right proximal ends 61*a*, and a pair of left and right distal ends 61*c* which are distal ends of the left and right arms 61*b*. The upper link member 61 is provided symmetrically with respect to the left-right center line CL of the vehicle body. The left and right arms 61*b* extend forward and inward in the left-right direction from the proximal ends 61*a* on the same left and right sides while being appropriately inclined, bent, and curved.

The lower link member 62 includes a pair of left and right proximal ends 62*a* disposed on outer side of the front portion of the bracket 40 in the left-right direction, a pair of left and right arms 62*b* inclined and extending forward and inward in the left-right direction from the left and right proximal ends 62*a*, and a pair of left and right distal ends 62*c* which are distal ends of the left and right arms 62*b*. The lower link member 62 is provided symmetrically with respect to the left-right center line CL of the vehicle body. The left and right arms 62*b* extend forward and inward in the left-right direction from the proximal ends 62*a* on the same left and right sides while being appropriately inclined, bent, and curved. The front portion of the bracket 40 is narrower in lateral width than the rear portion of the bracket 40, and the lower link member 62 is provided smaller than the upper link member 61 as a whole. A length of the lower link member 62 in a side view is less than a length of the upper link member 61 in a side view. The windscreen 31 is moved up and down via the upper and lower link members 61 and 62, so that an inclination angle of upward backward movement increases as the windscreen 31 rises.

The holder 50 includes a holder main body 51 having a rectangular frame shape and disposed to be inclined rearward and upward along a rear lower surface (rear surface) of the windscreen 31 in a side view, an upper link connection portion 52 that extends from an upper portion of the holder main body 51 to the vehicle body side and relatively rotatably connects the distal end 61*c* of the upper link member 61 via the rotation shaft along the left-right direction, and a lower link connection portion 53 that extends from a lower portion of the holder main body 51 to the vehicle body side and relatively rotatably connects the distal end 62*c* of the lower link member 62 via the rotation shaft along the left-right direction.

The support arms 51*a* extending toward the rear surface of the windscreen 31 are formed at four corners of the holder main body 51 on the windscreen 31 side. A fastening seat surface 51*a*1 displaced toward the windscreen 31 is formed on the distal end side of each support arm 51*a*. A portion of the windscreen 31 facing each fastening seat surface 51*a*1 is fastened to each fastening seat surface 51*a*1 using a bolt B1.

A rotary shaft that couples the upper link connection portion 42 of the bracket 40 and the proximal end 61*a* of the upper link member 61 is a shaft 54 that extends over the entire left-right width of the screen support mechanism 35. A screen lock device 56 allowing adjustment of the height of the windscreen 31 between the upper limit position and the lower limit position (allowing fixing at any height) is disposed on one side (left side) of the shaft 54 in the vehicle left-right direction. A line C1 in the drawing indicates a central axis of the shaft 54. Caps 69L and 69R each having a circular shape in a side view are attached to left and right ends of the shaft 54. The left cap 69L is rotatable around the shaft 54 together with an operation lever 66, a link side gear 58, and the upper link member 61 to be described later. In the right cap 69R, a double nut for fixing the right end of the shaft 54 is disposed, allowing absorption of a meshing tolerance of a bracket side gear 57 and a link side gear 58 described later.

The screen lock device 56 includes the bracket side gear 57 disposed coaxially with the shaft 54 and supported by the upper link connection portion 42 on the left side of the bracket 40 in a relatively non-rotatable manner, the link side gear 58 that is disposed coaxially with the shaft 54 on one side (left side) in the vehicle left-right direction with respect to the bracket side gear 57, is supported by the proximal end 61*a* of the upper link member 61 in a relatively non-rotatable manner, faces the bracket side gear 57 in an axial direction (left-right direction), and is movable forward and backward with respect to the bracket side gear 57 in the axial direction (left-right direction), and a gear lock mechanism 59 that is disposed on one side (left side) in the vehicle left-right direction with respect to the link side gear 58, and presses the link side gear 58 toward the other side (right side) of the vehicle left-right direction to mesh the link side gear 58 with the bracket side gear 57.

For example, uneven shapes 57*a* and 58*a* including a plurality of gear teeth aligned in circumferential directions of the gears 57 and 58, respectively, are formed on axially facing portions of the bracket side gear 57 and the link side gear 58. Uneven portions of the respective uneven shapes 57*a* and 58*a* are arranged at equal intervals in the circumferential direction of the gears 57 and 58, and can mesh with each other every time the respective gears 57 and 58 rotate relative to each other at a specified angle. The uneven portions of the respective uneven shapes 57*a* and 58*a* change axial heights of facing portions of the respective gears 57 and 58. When a force in the axial direction is applied so as to press the respective uneven shapes 57*a* and 58*a* against each other, the respective uneven shapes 57*a* and 58*a* mesh with each other, and relative rotation of the bracket side gear 57 and the link side gear 58 is regulated. Tapered surfaces are formed on both sides of the gear teeth in the circumferential direction, and the uneven shape 58*a* of the link side gear 58 can ride on the uneven shape 57*a* of the bracket side gear 57 when the bracket side gear 57 and the link side gear 58 are relatively rotated as described later.

The gear teeth (uneven shapes 57*a* and 58*a*) of the respective gears 57 and 58 may be formed in, for example, a waveform in which curved surfaces are continuous. In this case, when the bracket side gear 57 and the link side gear 58 are relatively rotated as described later, the uneven shape 58*a* of the link side gear 58 easily rides on the uneven shape 57*a* of the bracket side gear 57. As a result, the upper link member 61 smoothly swings with respect to the bracket 40.

Figure 7A:
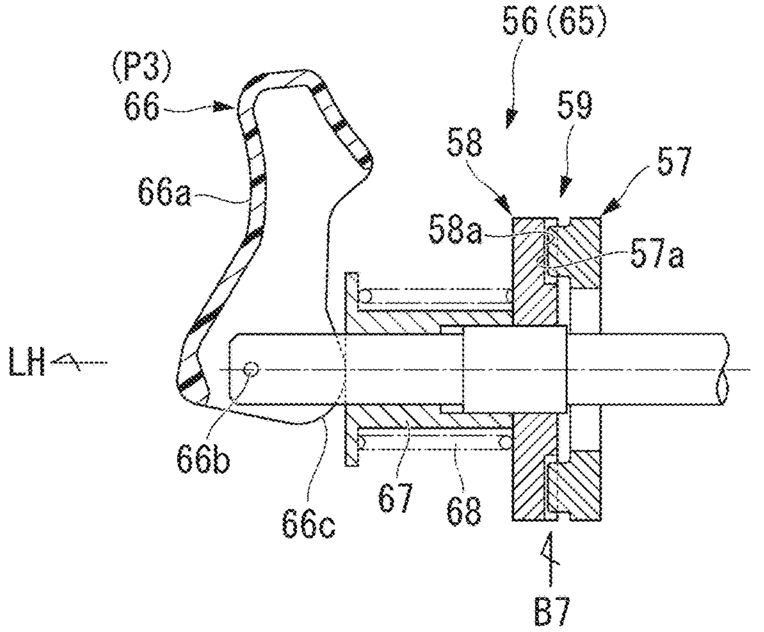
FIG. 7A is an explanatory view of a gear lock state of a gear lock mechanism of the screen lock device.
Figure 7B:
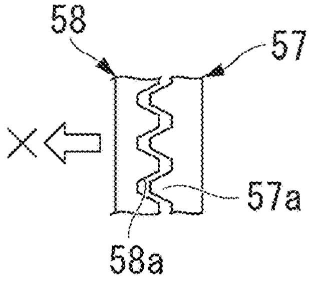
FIG. 7B is a view taken in a direction of an arrow B7 of FIG. 7A.
Figure 8A:
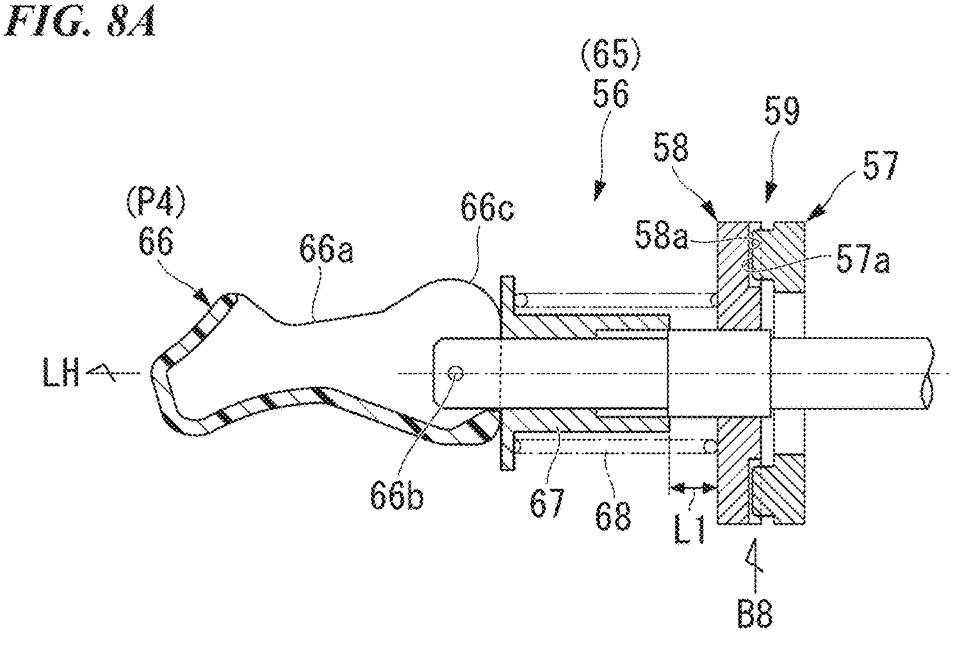
FIG. 8A is an explanatory view of a gear unlock state of the gear lock mechanism.

FIG. 7A is an explanatory view of a gear lock state of the gear lock mechanism 59, and FIG. 7B is a view taken in a direction of an arrow B7 of FIG. 7A. FIG. 8A is an explanatory view of a gear unlock state of the gear lock mechanism 59, and FIG. 8B is a view taken in a direction of an arrow B8 of FIG. 8A.

Referring to FIGS. 7A and 8A, the gear lock mechanism 59 includes an operator (operation lever 66) that switches between a first operation position (gear lock position P3) and a second operation position (gear unlock position P4), and a pressing member 67 that is pressed to the other side (right side) in the vehicle left-right direction by a cam portion 66*c* on the proximal end side of the operation lever 66 when the operation lever 66 is at the gear lock position P3, presses the link side gear 58 to the other side (bracket side gear 57 side) in the vehicle left-right direction, and releases pressing of the link side gear 58 to the other side in the vehicle left-right direction by releasing pressing to the other side in the vehicle left-right direction when the operation portion 65 is at the gear unlock position P4. In the drawing, reference number 66*a* denotes a lever body on which a user places a hand in the operation lever 66, and reference number 66*b* denotes a swing shaft of the operation lever 66.

Referring to FIGS. 7A and 7B, when the operation portion 65 is at the gear lock position P3, the respective uneven shapes 57*a* and 58*a* of the bracket side gear 57 and the link side gear 58 are engaged with each other by the pressing force of the pressing member 67, and the bracket side gear 57 and the link side gear 58 are locked in a relatively non-rotatable state.

Figure 8B:
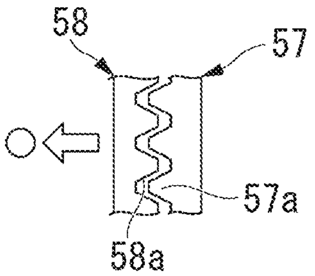
FIG. 8B is a view taken in a direction of an arrow B8 of FIG. 8A.

Referring to FIGS. 8A and 8B, when the operation portion 65 is at the gear unlock position P4, the respective uneven shapes 57*a* and 58*a* of the bracket side gear 57 and the link side gear 58 can be disengaged by the link side gear 58 moving to one side in the vehicle left-right direction, and the bracket side gear 57 and the link side gear 58 can rotate relative to each other.

An elastic member (coil spring 68) that is a compression spring is compressed between the pressing member 67 and the link side gear 58. Accordingly, even when the operation portion 65 is operated to the gear unlock position P4 (gear unlock position), the respective uneven shapes 57*a* and 58*a* of the bracket side gear 57 and the link side gear 58 maintain a state of being meshed with each other by a biasing force of the coil spring 68. At this time, the pressing member 67 moves leftward by the biasing force of the coil spring 68 and is separated from the link side gear 58 by a gap L1.

Since the bracket side gear 57 and the link side gear 58 are kept meshed with each other by the biasing force of the coil spring 68, even when torque based on the weight of the windscreen 31 and the holder 50 acts on the link side gear 58, relative rotation of the bracket side gear 57 and the link side gear 58 is regulated, and the current height of the windscreen 31 is maintained. Therefore, when the height of the windscreen 31 is adjusted, the height of the windscreen 31 at that time is maintained only by operating the operation portion 65 to the gear unlock position, so that the height of the windscreen 31 can be easily adjusted finely.

When torque greater than or equal to a specified value acts on the link side gear 58 while the operation portion 65 is operated to the gear unlock position, the uneven shape 58*a* of the link side gear 58 rides on the uneven shape 57*a* of the bracket side gear 57, and the link side gear 58 is displaced to one side in the vehicle left-right direction against the biasing force of the coil spring 68. As a result, the link side gear 58 can be rotated while shifting meshing of the uneven shapes 57*a* and 58*a* step by step. The link side gear 58 is displaced to one side in the vehicle left-right direction against the biasing force of the coil spring 68, and the bracket side gear 57 and the link side gear 58 are relatively rotatable.

When adjusting the height of the windscreen 31, first, the user raises a lever of the operation portion 65 on the left side of the shaft 54 so that the level swings from the lock position to the unlock position, and releases a lock state S1 of the lock operating portion. In the embodiment, the lock state S1 of the lock operating portion can be released by operating the operation portion 65 provided on one side of the shaft 54 in the vehicle left-right direction, and the unlock operation can be performed using one hand as compared with a constitution in which operation portions 65 are provided on both the left and right sides and operated. The occupant can operate the operation portion 65 using the left hand while operating a brake lever or the like generally supported on the right side of the handle 2.

The user rotates the operation portion 65 about the shaft 54 while raising the lever. At this time, the upper link member 61 can be swung by gripping a handle 61*d* formed on the left arm 61*b* of the upper link member 61. As a result, swing of the upper link member 61 and height adjustment of the windscreen 31 can be easily performed as compared with a constitution in which only the dial-shaped cap 69L coaxial with the shaft 54 is gripped and the upper link member 61 is swung.

In particular, in the embodiment, even when the operation lever 66 is swung to the gear unlock position P4, the bracket side gear 57 and the link side gear 58 maintain a state of being meshed with each other by a biasing force of the coil spring 68. Thus, the height of the windscreen 31 at that time is maintained only by swinging the operation lever 66 to the gear unlock position P4. When torque greater than or equal to a specified value is applied to the link side gear 58 and the upper link member 61 from this state, the height of the windscreen 31 can be adjusted by swinging the upper link member 61. Therefore, by providing the handle 61*d* at a position where a turning radius is ensured as compared with the cap 69L in the side view in the upper link member 61, torque is easily applied to the upper link member 61, and the height of the windscreen 31 can be easily adjusted.

As described above, a windscreen device 30 in the embodiment includes a windscreen 31, a holder 50 that supports the windscreen 31, a bracket 40 fixed to a vehicle body, upper and lower link members 61 and 62 having proximal ends 61*a* and 62*a* supported by the bracket 40 in a vertically swingable manner and supporting the holder 50 at distal ends 61*c* and 62*c*, and a shaft 54 extending along a vehicle left-right direction and passing through and connecting the proximal end 61*a* of the upper link member 61 and a link connection portion 42 of the bracket 40 in the vehicle left-right direction, wherein one side of the shaft 54 in the vehicle left-right direction has a bracket side gear 57 disposed coaxially with the shaft 54 and supported by the link connection portion 42 of the bracket 40 in a relatively non-rotatable manner, a link side gear 58 that is disposed coaxially with the shaft 54 outside the bracket side gear 57 in the vehicle left-right direction, is supported by the proximal end 61*a* of the upper link member 61 in a relatively non-rotatable manner, faces the bracket side gear 57 in an axial direction, and is movable forward and backward in the axial direction, and a gear lock mechanism 59 that is disposed outside the link side gear 58 in the vehicle left-right direction and presses the link side gear 58 inward in the vehicle left-right direction to fix the link side gear 58 and the bracket side gear 57 in a relatively non-rotatable state, rotation regulation portions (uneven shapes 57*a* and 58*a*) capable of regulating relative rotation of the bracket side gear 57 and the link side gear 58 are provided at axially facing portions of the bracket side gear 57 and the link side gear 58, respectively, and the gear lock mechanism 59 includes an operation lever 66 that switches between a gear lock position P3 and a gear unlock position P4, and a pressing member 67 that presses the link side gear 58 inward in the vehicle left-right direction when the operation lever 66 is at the gear lock position P3, and releases pressing of the link side gear 58 inward in the vehicle left-right direction when the operation lever 66 is at the gear unlock position P4, when the operation lever 66 is at the gear lock position P3, the respective rotation regulation portions (uneven shapes 57*a* and 58*a*) of the bracket side gear 57 and the link side gear 58 are fixed in a state of regulating relative rotation of the bracket side gear 57 and the link side gear 58 by a pressing force of the pressing member 67, and when the operation lever 66 is at the gear unlock position P4, the respective rotation regulation portions (uneven shapes 57*a* and 58*a*) of the bracket side gear 57 and the link side gear 58 are allowed to release regulation on relative rotation of the bracket side gear 57 and the link side gear 58 since the link side gear 58 is allowed to move outward in the vehicle left-right direction.

According to this constitution, the holder 50 supporting the windscreen 31 and the bracket 40 fixed to the vehicle body are connected via the upper and lower link members 61 and 62, and the bracket side gear 57 and the link side gear 58, which are relatively non-rotatable with respect to each other by pressing in the axial direction, are disposed at the proximal end 61*a* of the upper link member 61 on the bracket 40 side. The gear lock mechanism 59 disposed on one side in the vehicle left-right direction switches between pressing of the link side gear 58 by the pressing member 67 and release of the pressing through an operation of the operation lever 66. In a state where pressing by the pressing member 67 is released, the link side gear 58 is movable to the outside in the vehicle left-right direction, and relative rotation of the bracket side gear 57 and the link side gear 58 is allowed. By collectively disposing the gear lock mechanism 59 and the operation lever 66 on one side in the vehicle left-right direction, the user can perform one-hand operation, and the height of the windscreen 31 can be easily adjusted. It is possible to reduce the size of the mechanical component and the number of components, and it is possible to reduce the weight and size of the entire device.

In the windscreen device 30, the uneven shapes 57*a* and 58*a* meshing with each other are provided as rotation regulation portions on the axially facing portions of the bracket side gear 57 and the link side gear 58, respectively.

According to this constitution, since the uneven shapes 57*a* and 58*a* as the rotation regulation portions are provided at the respective facing portions of the bracket side gear 57 and the link side gear 58, relative rotation of the bracket side gear 57 and the link side gear 58 can be reliably regulated by pressing by the pressing member 67.

The windscreen device 30 includes the coil spring 68 contracted between the pressing member 67 and the link side gear 58. When the operation lever 66 is at the gear unlock position P4, the respective uneven shapes 57*a* and 58*a* of the bracket side gear 57 and the link side gear 58 are meshed with each other by the biasing force of the coil spring 68, and the pressing member 67 is separated from the link side gear 58 by the biasing force of the coil spring 68. In this state, the link side gear 58 can be displaced outward in the vehicle left-right direction against the biasing force of the coil spring 68 by the torque greater than or equal to a specified value, and the bracket side gear 57 and the link side gear 58 can rotate relative to each other.

According to this constitution, by biasing the link side gear 58 inward in the vehicle left-right direction using the coil spring 68, relative rotation of the bracket side gear 57 and the link side gear 58 is appropriately regulated even when pressing by the pressing member 67 is released. On the other hand, when the torque greater than or equal to a specified value acts on the link side gear 58, the uneven shape 58*a* of the link side gear 58 rides on the uneven shape 57*a* of the bracket side gear 57, the link side gear 58 is displaced outward in the vehicle left-right direction against the biasing force of the coil spring 68, and the link side gear 58 can be rotated while shifting meshing of the uneven shapes 57*a* and 58*a* step by step. As a result, after pressing of the link side gear 58 by the pressing member 67 of the gear lock mechanism 59 is released, the upper link member 61 can be swung with a predetermined click feeling with respect to the bracket 40, and the height of the windscreen 31 can be easily adjusted. By elastically temporarily holding the screen height by the biasing force of the elastic member, an operation procedure can be simplified as compared with, for example, a constitution in which the screen height is adjusted while the operator is pulled.

The present invention is not limited to the above embodiment, and for example, the rotation regulation portion is not limited to engagement between the uneven shapes, and may be frictional engagement between flat portions, or may be another engaging means. The operator of the lock mechanism is not limited to the operation lever, and may be a handle for pushing and pulling in the axial direction, a dial that rotates around the axis, or another operator.

The windscreen device 30 according to the present embodiment may be applied to saddle-ride vehicles other than motorcycles. The saddle-ride vehicle includes general vehicles the vehicle body of which a driver straddles, and includes not only motorcycles (including bicycles including prime movers and scooter type vehicles) but also three-wheeled vehicles (including, in addition to a vehicle including one front wheel and two rear wheels, a vehicle including two front wheels and one rear wheel) or four-wheeled vehicles (such as four-wheeled buggies).

The constitution in the above embodiments is an example of the present invention, and various modifications can be made without departing from the gist of the present invention, such as replacing a component element in an embodiment with a known component element.

What is claimed is:

1. A windscreen device comprising:

a windscreen;

a holder that supports the windscreen;

a bracket fixed to a vehicle body;

link members having proximal ends supported by the bracket in a vertically swingable manner and supporting the holder at distal ends; and a shaft extending along a vehicle left-right direction and passing through and connecting the proximal end of the link member and a link connection portion of the bracket in the vehicle left-right direction, wherein one side of the shaft in the vehicle left-right direction has a bracket side engagement member disposed coaxially with the shaft and supported by the link connection portion of the bracket in a relatively non-rotatable manner, a link side engagement member that is disposed coaxially with the shaft outside the bracket side engagement member in the vehicle left-right direction, is supported by the proximal end of the link member in a relatively non-rotatable manner, faces the bracket side engagement member in an axial direction, and is movable forward and backward in the axial direction, and a lock mechanism that is disposed outside the link side engagement member in the vehicle left-right direction and presses the link side engagement member inward in the vehicle left-right direction to fix the link side engagement member and the bracket side engagement member in a relatively non-rotatable state, rotation regulation portions capable of regulating relative rotation of the bracket side engagement member and the link side engagement member are provided at axially facing portions of the bracket side engagement member and the link side engagement member, respectively, and the lock mechanism includes an operator that switches between a lock position and an unlock position, and a pressing member that presses the link side engagement member inward in the vehicle left-right direction when the operator is at the lock position, and releases pressing of the link side engagement member inward in the vehicle left-right direction when the operator is at the unlock position, when the operator is at the lock position, the respective rotation regulation portions of the bracket side engagement member and the link side engagement member are fixed in a state of regulating relative rotation of the bracket side engagement member and the link side engagement member by a pressing force of the pressing member, and when the operator is at the unlock position, the respective rotation regulation portions of the bracket side engagement member and the link side engagement member are allowed to release regulation on relative rotation of the bracket side engagement member and the link side engagement member since the link side engagement member is allowed to move outward in the vehicle left-right direction.

2. The windscreen device according to claim 1, wherein uneven shapes meshing with each other are provided as the rotation regulation portions on the axially facing portions of the bracket side engagement member and the link side engagement member, respectively.

3. The windscreen device according to claim 2, comprising an elastic member compressed between the pressing member and the link side engagement member, wherein, when the operator is at the unlock position, the respective uneven shapes of the bracket side engagement member and the link side engagement member are meshed with each other by a biasing force of the elastic member, the pressing member is separated from the link side engagement member by the biasing force of the elastic member, in this state, the link side engagement member is displaceable outward in the vehicle left-right direction against the biasing force of the elastic member by torque greater than or equal to a specified value, and the bracket side engagement member and the link side engagement member are relatively rotatable.

* * * * *